United States Patent [19]

Desai

[11] Patent Number: 5,403,490
[45] Date of Patent: Apr. 4, 1995

[54] PROCESS AND APPARATUS FOR REMOVING SOLUTES FROM SOLUTIONS

[76] Inventor: Satish Desai, 382 E. California Blvd., #204, Pasadena, Calif. 91106

[21] Appl. No.: 980,373

[22] Filed: Nov. 23, 1992

[51] Int. Cl.$^6$ ............................................. B01D 61/00
[52] U.S. Cl. .................................. 210/652; 210/663; 210/651; 210/737; 210/738; 210/688; 210/195.2; 210/257.2; 210/790; 210/749
[58] Field of Search ............... 210/652, 650, 651, 774, 210/681, 684, 688, 694, 710, 638, 195.2, 737, 738, 257.1, 663, 790, 749; 204/232

[56] References Cited

U.S. PATENT DOCUMENTS

| | | | |
|---|---|---|---|
| 4,244,505 | 1/1981 | Stokes et al. | 210/652 |
| 4,652,352 | 3/1987 | Saieva | 210/660 |
| 4,680,126 | 7/1987 | Frankard et al. | 210/710 |
| 4,758,320 | 7/1988 | Sanchez et al. | 210/650 |
| 4,775,480 | 10/1988 | Milton et al. | 210/195.2 |
| 4,880,511 | 11/1989 | Sugita | 210/652 |
| 4,885,095 | 12/1989 | Rich | 210/652 |
| 5,192,418 | 3/1993 | Hughes et al. | 210/652 |
| 5,200,082 | 4/1993 | Olsen et al. | 210/688 |
| 5,204,001 | 4/1993 | Tonelli et al. | 210/608 |

FOREIGN PATENT DOCUMENTS 4031979 4/1992 Germany ..................... 210/195.2

Primary Examiner—Robert A. Dawson
Assistant Examiner—Ana M. Fortuna
Attorney, Agent, or Firm—Arnold, White & Durkee

[57] ABSTRACT

An improved process and system for treating a solution of a solute which can be concentrated by forcing a portion of the solvent through a semi-permeable membrane and converted to the solid phase by increasing the concentration of the solute in the solution. A phase conversion device receives the solution and converts a portion of the solute to the solid phase. The resulting mixture is passed through a separation device such as a filter to remove the solids from the remaining solution. A concentration device such as a reverse osmosis, electrodialysis or ultrafiltration device treats the resultant solution discharging a permeate of solvent essentially free of solute and a concentrate enriched in solute. A recycle line recycles the concentrate to the phase conversion device to advance precipitation of the solute by driving the solubility equilibrium toward precipitation.

24 Claims, 2 Drawing Sheets

PROCESS AND APPARATUS FOR REMOVING SOLUTES FROM SOLUTIONS

FIELD OF THE INVENTION

This invention relates generally to the concentration and subsequent removal of solutes from solutions, particularly dilute aqueous solutions. The invention is primarily directed to the removal of solutes which can be concentrated by processes such as reverse osmosis, electrodialysis, or ultrafiltration, and which can be converted to the solid phase by increasing the concentration of the solute in the solution.

As used herein, the term "solute" includes not only solutes in true solutions, but also the non liquid phase of quasi-solutions such as colloids and emulsions, such as laundry waste water.

SUMMARY OF THE INVENTION

One aspect of the present invention is directed to a system for treating a solution of a solute which can be concentrated by removing a portion of the solvent by forcing a portion of the solvent through a semipermeable membrane, and which can be converted to the solid phase by increasing the concentration of the solute beyond the solubility equilibrium concentration. A portion of the solute is converted to the solid phase in a phase conversion device, such as a precipitation or crystallization tank, and the resulting solids are removed from the remaining solution in a phase separation device such as a filter. The remaining solution is then fed to a concentration device such as a reverse osmosis, electrodialysis or ultrafiltration unit, which produces a first liquid stream comprising solvent essentially free of solute, and a second liquid stream comprising a concentrated solute. A recycle line recycles the concentrate to a phase conversion device, such as the precipitation or crystallization tank, to increase the concentration of the solute in that device.

DETAILED DESCRIPTION OF THE INVENTION

Figure 1:
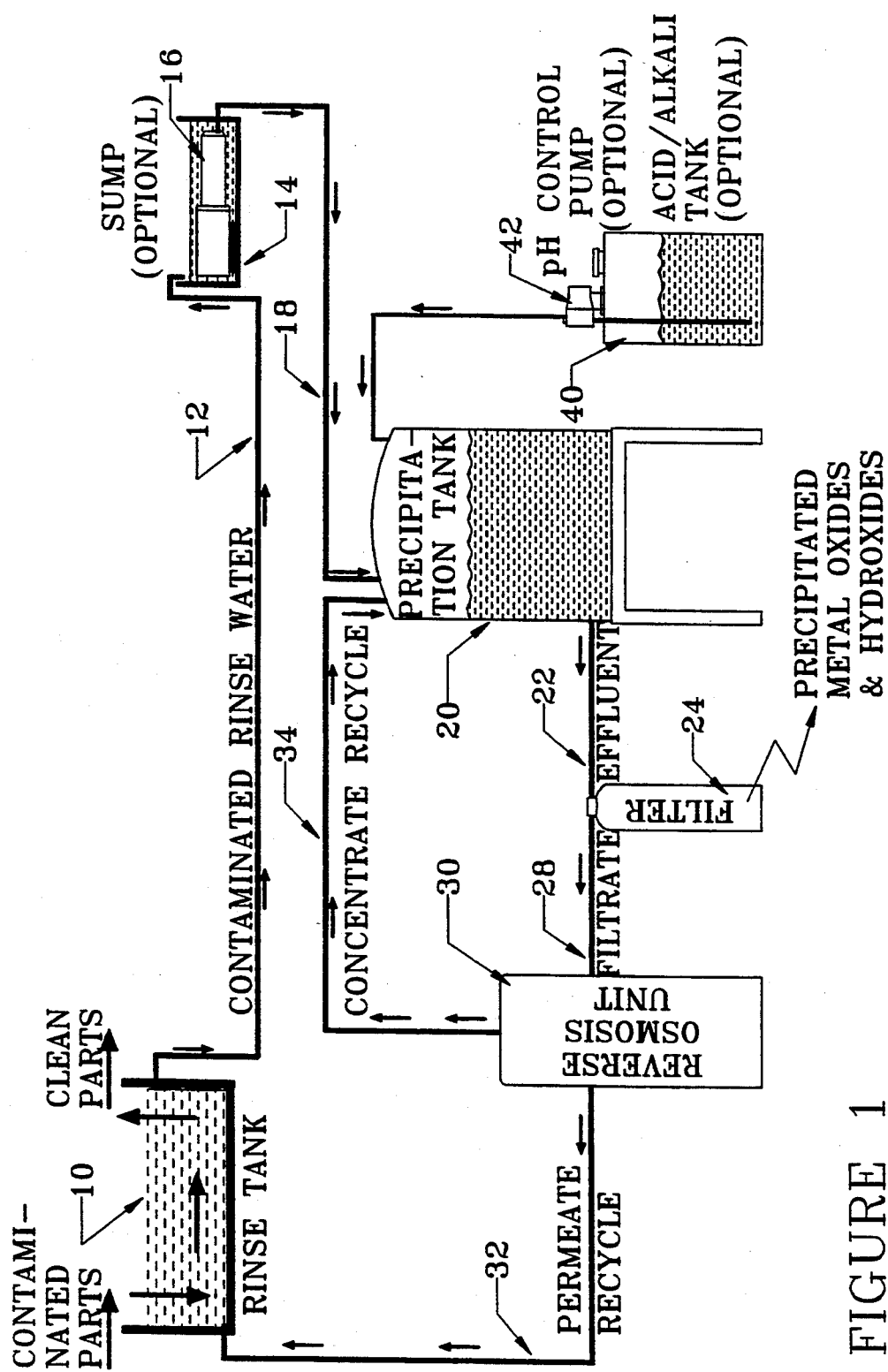
FIG. 1 is a schematic flow diagram of a treatment system embodying the present invention.

While the invention is susceptible to various modifications and alternative forms, specific embodiments thereof have been shown by way of example in the drawings and will herein be described in detail. It should be understood, however, that it is not intended to limit the invention to the particular forms disclosed, but, on the contrary, the intention is to cover all modifications, equivalents, and alternatives falling within the spirit and scope of the invention as defined by the appended claims.

The present invention has applications in several different industries. Metal finishing industries, such as electroplating, electroless plating, anodizing, galvanizing, pickling, passivation and chemical plating, etching, and milling, generate millions of gallons of water contaminated with hazardous solutes each year. The present invention can be used by such hazardous waste generating industries to conform with water pollution control laws.

Chemical manufacturers, as in the dyestuff, pharmaceutical and photographic industries, generate aqueous solutions of valuable dissolved compounds, such as hexachloroethane, trinitrobenzene, trinintrotoluene, naphthalene, naphthoic acid, benzoic acid, phthalic acid, camphor and hydroquinone. The present invention can be used to efficiently and effectively recover such products while at the same time avoiding the discharge of potentially dangerous solutions of dissolved product into the surrounding environment.

As depicted in FIG. 1, one application of the present invention is the treatment of rinse water in an electroplating operation. Parts carrying metal ions, such as aluminum ($Al^{3+}$), aluminate ($AlO_2^-$), hexavalent chromic ($Cr^{6+}$), trivalent chromic ($Cr^{3+}$), chromate ($CRO_4^{2-}$), zinc ($Zn^{2+}$), cuprous ($Cu^+$), cupric ($Cu^{2+}$) nickel ($Ni^{2+}$), cadmium ($Cd^{2+}$), ferric ($Fe^{3+}$), ferrous ($Fe^{2+}$), mercuous ($Hg^+$), mercuric ($Hg^{2+}$), silver ($Ag^+$), stannous ($Sn^{2+}$), stannic ($Sn^{4+}$), aurous ($Au^+$) or auric ($Au^{3+}$), are submerged in a rinse tank 10 to remove residue containing metal ions from the plating process. The rinse tank 10 discharges an aqueous solution of metal ions through a line 12 to a sump 14, where a pump 16 periodically delivers the aqueous solution through a line 18 to a precipitation tank 20.

A portion of the metal ions precipitate from the aqueous solution in the precipitation tank 20 to form a mixture of an aqueous solution of metal ions and a precipitate of metal oxides and metal hydroxides. The precipitation tank 20 provides a residence time sufficient for precipitation of a portion of the solute. Precipitation is a rate process, i.e., the amount of precipitate formed is time dependent. A residence time in the range of one to two hours is preferable, but longer or shorter residence times may be suitable in certain applications. The precipitation may be effected by concentration differential alone or with the addition of neutralization, fermentation, oxidation and/or reduction of specific ions to promote additional precipitation. In certain applications the precipitation may be effected by a substitution reaction, as in the recovery of gold from a gold cyanide solution by the addition of zinc to form a zinc cyanide solution and gold precipitate.

The metal ions normally precipitate in the form of metal oxides and metal hydroxides. For example, nickel sulfate, a commonly used salt in electroplating processes, dissolves by forming nickel ions ($Ni^{2+}$) in an acidic aqueous medium. The nickel ions ($Ni^{2+}$) are concentrated in the precipitation tank 20 to the extent that they oxidize to form nickel oxide and nickel hydroxide precipitate. The minimum concentration at which the metal ions form a precipitate is generally in the range of 0.05 to 10 ppm, at neutral or near neutral pH.

A mixture of the aqueous solution and the precipitate leave the precipitation tank 20 through a line 22. An appreciable concentration of dissolved metal ions is still contained in the aqueous solution. The concentration of metal ions in this effluent is primarily a function of the pH of the aqueous solution in the precipitation tank 20, and of the solubility of the metal ions. The concentration of metal ions in the aqueous phase of the effluent is typically in the range of 0.05 to 100 ppm.

The line 22 conveys the effluent from the precipitation tank 20 to a filter 24, where the precipitate is removed from the aqueous solution. The filter 24, which may be a sand, bag, vacuum, pressure, rotary, or precoat filter, removes the solid metal oxides and metal hydroxides and discharges the remaining aqueous solution as a liquid filtrate. The metal oxides and hydroxides are not considered toxic and, therefore, can be easily and safely disposed of. After prolonged use, the filter media may be replaced or regenerated by backwashing with the contents of the tank 20. When a backwash is produced, it may be passed through a filter of smaller size where the particles are trapped, and the clear liquid may be returned to the precipitation tank 20.

The filtrate from the filter 24 is transferred through a line 28 to a concentration device 30, such as a reverse osmosis unit. A reverse osmosis unit produces a permeate which is an aqueous stream essentially free of metal ions, and a concentrate which is an aqueous solution enriched in metal ions. A concentration factor in the range of 1.5 to 4.0 is sufficient. Preferably, the permeate has a concentration of metal ions in the range of 0.005 to 10 ppm, and the concentrate has a concentration of metal ions in the range of 0.1 to 200 ppm. The permeate is recycled through a line 32 to the rinse tank 10, and the concentrate is recycled through a line 34 to the precipitation tank 20. The recycled concentrate advances precipitation of the metal ions as metal oxides and metal hydroxides in the precipitation tank 20 by increasing the concentration of metal ions beyond the concentration allowed by the equilibrium solubility. The permeate provides water essentially free of metal ions to the rinse tank 10 to replace the liquid discharged through the outlet line 12.

If desired, the concentrate from the reverse osmosis unit may be recycled to a precipitation tank that does not receive the process stream. That is, two precipitation tanks could be used, one to receive the process stream, and the other to receive the recycle stream from the reverse osmosis unit. The effluents from both precipitation tanks would be treated in the same or different filters, with the resulting filtrate(s) being fed to the reverse osmosis unit. One such application is in the recovery of gold from a gold cyanide solution, where gold is precipitated from the process stream by the addition of zinc. The precipitate is removed by filtering, and the filtrate is fed to a reverse osmosis unit. The recovered water is returned to the gold cyanide solution, and the resulting concentrate is fed to a second precipitation tank where the zinc is precipitated as hydroxide by the addition of an oxidizing agent such as chlorine and a neutralizing agent. The precipitate is removed by filtering, and the filtrate is returned to the same reverse osmosis unit that receives the filtrate from the gold filter. Alternatively, the filtrate from the zinc hydroxide filter could be fed to a second reverse osmosis unit, with the resulting concentrate being recycled to the second precipitation tank. In such a two-stage process, portions of the concentrate from the first reverse osmosis unit could be fed to each of the two precipitation tanks.

One advantage of the present invention is that the per-pass recovery factor, which is preferably low for typical reverse osmosis units, does not affect the overall systematic recovery of water. The overall recovery of water remains at nearly 100% regardless of the per-pass recovery of water. As a result of maintaining a low per-pass recovery factor, the potential for internal corrosion and fouling of the concentration device is significantly reduced, and the life of the reverse osmosis membrane is relatively long.

Another advantage of the system provided by this invention is that there is no need to monitor and match flows. Water is used as a working fluid, and it is not necessary to discharge any water to the sewer or surrounding environment. When used in operations involving multiple plating baths, cross-contamination in the plating baths is avoided. Rinse quality is improved because the recycled permeate is essentially free of metal ions. Thus a single system of the type illustrated may be used to process rinse water from multiple plating operations with different ions. As a result of recycling all streams containing water, the need for make-up water is reduced to that needed to replace any water lost by evaporation, leaks and the like.

The reverse osmosis unit 30 may be supplemented or replaced with an alternative concentration device such as an electrodialysis unit or an ultrafiltration unit, depending upon the composition of the solution being treated. As the concentration of dissolved solute increases in the feed stream to the concentration device, the osmotic pressure of the solution also increases. This requires a greater amount of pressure on the feed side of the semi-permeable membranes in order to force the solvent out. This difficulty can be avoided by choosing the membrane process which selectively concentrates only the solute to be removed.

Electrodialysis is based on diffusion of ions through porous membranes under the influence of applied electric fields, and is capable of handling higher solute levels than reverse osmosis. In electrodialysis, cations pass in one direction through a cation membrane while anions pass in the opposite direction through an anion membrane, leaving a "demineralized" liquid which corresponds to the ion-free permeate produced by a reverse osmosis unit. The cations and anions which permeate through the respective electrodialysis membranes are collected in a concentrating compartment to form a concentrate, which is the liquid stream that is recycled to the precipitation tank. In reversal electrodialysis, the catholyte and anolyte compartments are switched by means of valves, to maintain pH neutrality of the exiting concentrate. Electrodialysis is generally not capable of purifying the solvent to the same degree as reverse osmosis, but because the solvent is used primarily as a working fluid in the preferred embodiments of the present invention, the purity of the solvent is of less importance than it is when the treated solvent is being discharged to the environment. Electrodialysis is particularly useful in separating an organic substance from a strong electrolyte.

Ultrafiltration is similar to reverse osmosis except that the impurities removed by the semi-permeable membranes are removed strictly on the basis of molecular size, regardless of ionic charge and regardless of whether they are dissolved, semi-dissolved, colloidal or particulate. Ultrafiltration is used primarily to concentrate organic materials of large molecular size in the feed stream to the concentration device. The cut-off pore size of typical commercial ultrafiltration membranes is 0.001 to 0.05 micrometers. Ultrafiltration allows ionic species of small molecular size such as metal ions and anions to pass through the semi-permeable membrane. This presents an advantage over reverse osmosis in situations where a large concentration of metal ions such as $Na^+$, $K^+$, $Cl^-$, and $So_{4--}$ are present. These ions become a part of the working fluid in the ultrafiltration process. Thus, only organics are selectively concentrated by the ultrafiltration device, and selectively precipitated in the precipitation tank. Because ultrafiltration membranes are permeable to small ions, there is no increase in osmotic pressure due to these ions. As a result, ultrafiltration membranes can be operated at a relatively low pressure. Also, ultrafiltration membranes have a relatively high porosity, which enables them to operate at reduced operating pressures. Consequently, ultrafiltration is the preferred concentration technique when the solute is a molecule of large size. It can be operated at low pressures, requiring minimal energy.

The illustrative system optionally includes a pH control tank 40 which contains an acid or alkali solution for controlling the pH in the precipitation tank 20. A pump 42 supplies the acid or alkali solution to the precipitation tank 20 in amounts sufficient to maintain the pH of the contents of the precipitation tank 20 at a predetermined value. For most aqueous solutions of metal ions, the pH is preferably in the range of 7.0 to 9.0. One advantage of the present invention is that the exact value of the pH in the precipitation tank is less critical than in conventional precipitation processes.

In electroplating processes, solutes in the precipitation tank 20 can further include certain metal complexes which are highly soluble in water and do not precipitate out under normal conditions of operation. Such soluble complexes of metal may be converted to non-soluble forms by reacting them with suitable chemical agents. For example, soluble chromate, $Cr^{6+}(OH)_8^-$, can be reduced to chromic ions, $Cr^{3+}$, by addition of known reducing agents such as sodium metabisulfite and ferrous sulfate to the precipitation tank 20 under acidic conditions. The chromic ions will then precipitate out in the form of chromium oxide, $Cr_2O_3$, and hydroxide, $Cr^{3+}(OH)^-_3$, in the normal fashion when the solution is neutralized to a pH of approximately 8.4. Another example of treating soluble complexes is zinc cyanide, $Zn^{2+}(CN)^-_2$. Known oxidizing agents such as sodium hypochlorite, chlorine gas and ozone gas may be added, bubbled through or dispersed into the precipitation tank 20, resulting in oxidation of the cyanide ions and consequent precipitation of zinc in the form of zinc oxide, ZnO, and zinc hydroxide, $Zn^{2+}(OH)^-_2$.

In electroplating processes, the solute can contain dissolved organic matter, such as brighteners, degreasers and paint strippers, which fail to precipitate when concentrated in the precipitation tank 20. Examples of such organic materials include phenolic compounds, 1,1,1-trichloroethylene, methylene chloride, dichloromethane, boric acid and cresylic acid. Unless removed from the overall system, these inert materials may accumulate in the tank 20 and reduce the efficiency of the reverse osmosis unit. Such dissolved organic materials can be removed by placing a second filter, containing special media such as activated charcoal which is selective to the impurity to be removed, in the line 28 between the filter 24 and the reverse osmosis unit 30, or by including such special media in the filter 24.

Modified versions of the system described above can be applied to different solvents and solutes. For example, certain solutes crystallize or coagulate when their supersaturated solution is allowed to stand or is cooled. For such solutions the precipitation tank is replaced with a crystallization or coagulation tank. Both types of tanks are phase conversion devices. One example of an application involving solutes that crystallize is the removal of naphthols from organic reaction mixtures.

Both α and β naphthols are used extensively as intermediates in the organic synthesis of dyestuffs, photographic chemicals and pharmaceuticals. These reactions are often carried out in the liquid phase, and when the reaction is incomplete the reaction mixture is contaminated with the naphthol used as a starting material. One way of removing the naphthol from the reaction mixture is by extraction with an immiscible solvent in which the naphthol is much more soluble than the desired reaction products. With the process of this invention, water can be used as the extraction solvent even though naphthol has only limited solubility in water (e.g., 750 mg/L). The water can be returned to the reaction mixture as often as necessary to remove the naphthol. Also, there is no need to dispose of naphthol-containing water, which is considered highly toxic to the environment.

Figure 2:
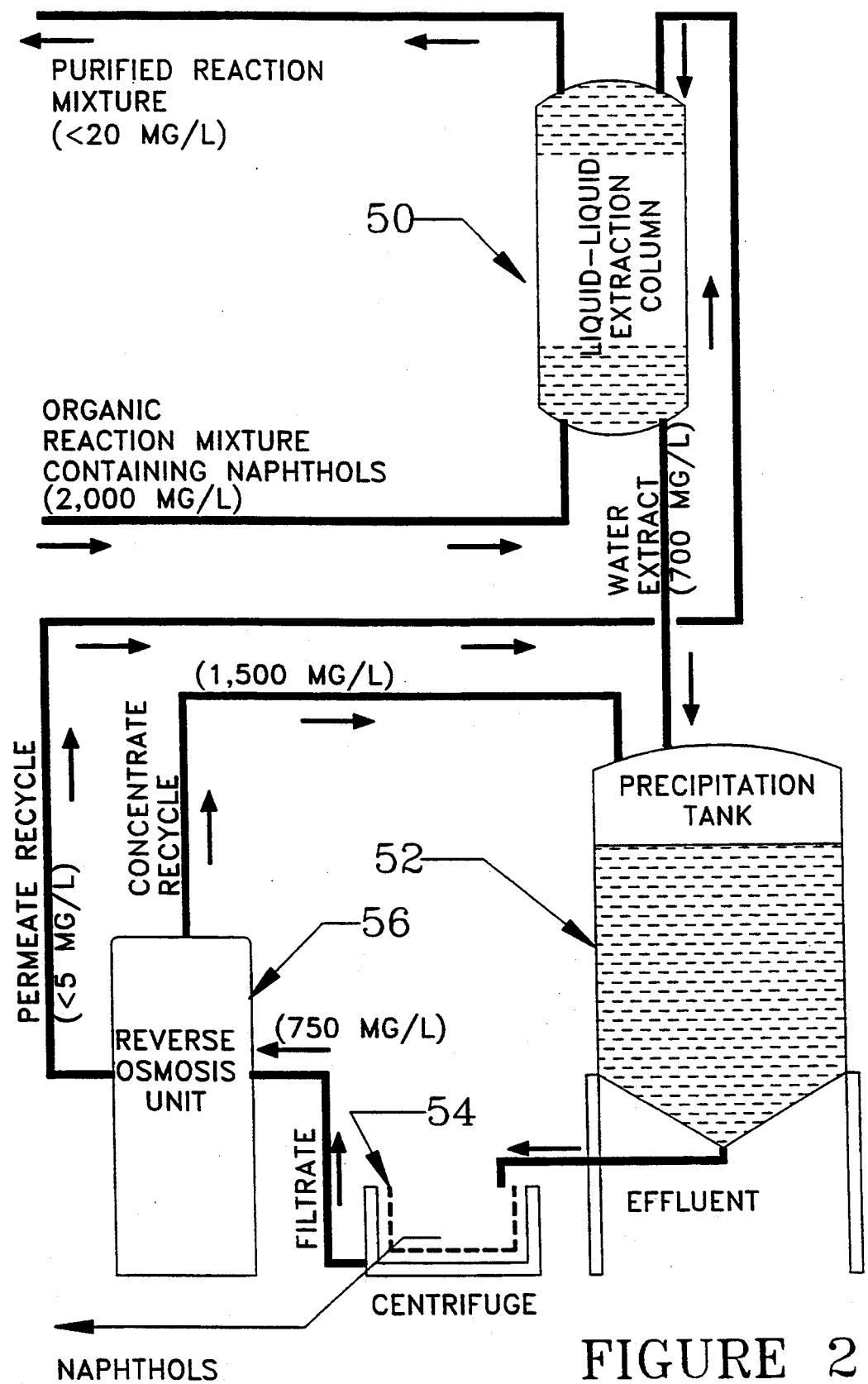
FIG. 2 is a schematic flow diagram of a modified treatment system embodying the present invention.

FIG. 2 shows an implementation of the present invention for efficient removal of naphthols from reaction mixtures which are immiscible with water. A typical concentration of naphthols in the reaction mixture is 2000 mg/L. The reaction mixture is passed through a counter-current, liquid-liquid extraction column 50 in which water is the extraction phase. The resulting purified reaction mixture typically contains less than 20 mg/L of naphthols. The exiting water phase typically contains 700 mg/L of naphthols, which is slightly under its solubility limit of 750 mg/L at neutral pH and at 25° C.

The water extract from the extraction column 50 is supplied to a precipitation tank 52. The effluent from the precipitation tank 52 contains a saturated solution of naphthols (750 mg/L) and the excess naphthols which have precipitated out as fine crystals. This physical mixture is separated in a centrifuge 54 or other suitable filtration device. The resulting filtrate, which is a clear, saturated solution of naphthol, is then passed through a reverse osmosis unit 56. The permeate from the reverse osmosis unit 56, which is essentially pure water, is recycled back to the extraction column 50. The concentrate from the reverse osmosis unit 56, which is enriched in naphthols, is recycled back to the precipitation tank 52 wherein it is mixed with the water extract from the column 50. After an initial induction period, a steady state is established in which the rate of precipitation of naphthols in the tank 52 is equal to the rate of extraction of naphthols by the water phase in the extraction column.

Other solutes which may be efficiently extracted from reaction mixtures in a similar manner are hexachloroethane, 1-3-5 trinitrobenzene, trinitrotoluene, naphthoic acid, and camphor. Benzoic acid and phthalic acid can also be extracted by the process of this invention. These substances may be removed efficiently using reverse osmosis if they are neutralized in the precipitation tank. Neutralization of benzoic acid to a pH of 8 to 9 produces benzoate ions which are retained by a reverse osmosis membrane because of their ionic character. Without neutralization, benzoic acid and phthalic acid are not removed efficiently by reverse osmosis membranes because of their relatively low molecular weights. Consequently, the entering water phase in the extraction column 50 may contain higher amounts of the solute. This means that a greater amount of water phase is required for the efficient purification of the reaction mixture, which in turn means a larger reverse osmosis unit is required. A portion of the benzoic acid or phthalic acid is removed in each pass, and since there is no limitation on the number of passes, the acid is eventually removed completely. The net results are still the same, i.e., there is no liquid discharge from the process, and the solutes are recovered in a solid, compact form.

In one experimental example of the present invention, an industrial plating process consisting of an alkali cleaning tank, an acid cleaning tank, a nickel sulfamate plating tank, and a copper sulfate plating tank was coupled to the rinse treatment system as depicted in FIG. 1. A series of rinse tanks, including an alkali rinse tank, an acid rinse tank, and a Cu/Ni plating rinse tank, discharged their respective aqueous solutions into a common sump. A sump pump periodically transferred the aqueous solution of dissolved copper and nickel ions into a 50-gallon precipitation tank positioned 6 feet above ground level so as to provide a net gravity head pressure of 6 feet of water, or 2.64 psi.

City water was supplied through a water softener to prevent scaling of the membrane in the reverse osmosis unit. The softened water was passed through a carbon filter which removed chlorine to prevent oxidative destruction of the membrane of the reverse osmosis unit. The softened and chlorine-free city water was supplied to the precipitation tank.

The effluent from the precipitation tank was conveyed to a sand filter to remove precipitate from the effluent. The sand filter consisted of an 8-inch diameter by 18-inch high tank filled with inert, anhydrous aluminosilicate medium, which was capable of trapping particles having a particle size above about 20 microns.

The filtrate was fed to a reverse osmosis unit, which was a Blue Spring System WP-25 Reverse Osmosis Unit, which contained a polyamide type thin-film-composite membrane. The reverse osmosis unit was operated at a pressure of 200–225 psig. The reverse osmosis unit discharged a concentrate through one recycle line to the precipitation tank, and discharged a permeate through another recycle line to the rinse tanks. Flowmeters and flow-control valves were installed in the individual lines to the rinse tanks to allow controlled distribution of flow to the three tanks.

Initially, the entire treatment system was emptied, and then flushed with city water. The precipitation tank was filled to a 30-gallon level, and maintained a minimum level of 30 gallons by a float valve. The three rinse tanks were allowed to fill with reverse osmosis permeate while the precipitation tank was being filled with treated city water. The maximum level was attained when the liquid in the sump was emptied into the precipitation tank by the sump pump. The initial electrical conductivity of the softened/dechlorinated water in the precipitation tank was 600 $\mu$S/cm. Electrical conductivity was monitored to determine the concentration of dissolved ions in the aqueous solution. The initial conductivity of the softened/dechlorinated city water was apparently due to the presence of sodium, potassium, chloride and sulfate ions.

The electroplating operation was started after filling the rinse tanks with reverse osmosis permeate. The treatment system was continued in operation for a total duration of 500 hours. Analytical data, such as pH, electrical conductivity and flow rates, were taken at various time intervals. The results of the experimental run are tabulated in Table 1.

| Time | t = 0 | t = 132 hrs. | t = 400 hrs. | t = 500 hrs. |
| --- | --- | --- | --- | --- |
| Permeate Flow Rate (gph) | 24 | 24 | 24 | 19.5 |
| Concentrate Flow Rate (gph) | 36 | 36 | 36 | 34 |
| Filtrate Flow Rate (gph) | 60 | 60 | 60 | 53.5 |
| % Recovery of Water by RO Device | 40 | 40 | 40 | 36 |
| Electrical Conductivity of Effluent ($\mu$s/cm) | 600.00 | 1170.0 | 600.0 | 570.0 |
| Electrical Conductivity of Permeate ($\mu$s/cm) | 5.0 | Not meas. | Not meas. | Not meas. |
| pH of Permeate | 7.6 | Not meas. | Not meas. | Not meas. |
| Electrical Conductivity in Cu/Ni Plating Rinse Tank ($\mu$s/cm) | 5.0 | 12.0 | 5.0 | 4.4 |
| Electrical Conductivity in Alkali Rinse Tank ($\mu$s/cm) | 5.0 | 37.0 | 13.5 | 20.0 |
| Electrical Conductivity in Acid Rinse Tank ($\mu$s/cm) | 5.0 | 41.0 | 47 | 135.0 |
| pH of Effluent in Precipitation Tank | 8.4 | 9.0 | 6.5 | 6.0 |
| pH in Ni/Cu Plating Rinse Tank | 7.6 | 9.0 | 5.0 | 6.0 |
| pH in Alkali Rinse Tank | 7.6 | 7.7 | 5.0 | 6.0 |
| pH in Acid Rinse Tank | 7.6 | 9.0 | 4.6 | 6.0 |

I claim:
1. A process for treating a substantially continuous stream of a solution of solute and solvent which can be concentrated by passing a portion of the solvent through a semi-impermeable membrane and in which the solute can be converted to a solidified form by increasing the concentration of the solute in the solution, said process comprising the steps of
   providing a source of starting solution;
   treating a portion of said solution to convert a portion of the solute in said solution to the solid phase to produce a mixture of the solution and the solidified solute;
   removing the solidified solute from said mixture;
   subjecting the remaining solution to a semi-impermeable membrane to produce a first liquid stream comprising solvent essentially free from solute and a second liquid stream comprising a concentrated solution of solute;
   recycling substantially all of said first liquid stream to the source of the starting solution;
   converting at least a portion of the solute in substantially all of said second liquid stream to the solid phase to produce a mixture of the solution and the solidified solute;

removing the solidified solute from the mixture produced from said concentrate; and returning the remaining solution to said semi-impermeable membrane.

2. The process of claim 1 wherein said second liquid stream is recycled and mixed with the starting solution so that a portion of the solute in both said second liquid steam and the starting solution is concurrently converted to the solid phase.

3. The process of claim 1 wherein said semi-impermeable membrane is contained in a reverse osmosis, electrodialysis, or ultrafiltration unit.

4. The process of claim 1 wherein said semi-permeable membrane is contained in a reverse osmosis or ultrafiltration unit, said first liquid stream is a permeate, and said second liquid stream is a concentrate.

5. The process of claim 1 wherein said semi-permeable membrane is contained in an electrodialysis unit, said first liquid stream is a demineralized stream, and said second liquid stream is a concentrate.

6. The process of claim 1 wherein the converting of solute to the solid phase is effected by precipitation, coagulation or crystallization.

7. The process of claim 6 wherein said precipitation or crystallization is promoted by cooling, heating or agitation.

8. The process of claim 1 wherein the removing of solidified solute is effected by filtration.

9. The process of claim 1 wherein said solution is an aqueous solution of metal ions and said solid phase comprises solid metal oxides and solid metal hydroxides.

10. The process of claim 9 wherein said metal ions include at least one of $Al^{3+}$, $AlO_2^-$, $Cr^{6+}$, $Cr^{3+}$, $Cu^+$, $Zn^{2+}$, $Cu^{2+}$, $Ni^{2+}$, $Cd^{2+}$, $Fe^{3+}$, $Fe^{2+}$, $Hg^{2+}$, $Hg^+$, $Ag^+$, $Sn^{2+}$, $Sn^{4+}$, $Au^+$ and $Au^{3+}$.

11. The process of claim 10 wherein said metal ions include $Cr^{6+}$ ions, and which includes the step of reducing said $Cr^{6+}$ ions to $Cr^{3+}$ ions.

12. The process of claim 10 wherein said metal ions further include $CN^-$ ions, and which includes the step of oxidizing said $CN^-$ ions.

13. The process of claim 1 wherein said solute includes ions in a complex form, and which includes the step of converting said ions by oxidation, fermentation, reduction, neutralization or substitution to a form which promotes precipitation.

14. The process of claim 1 which includes the step of adding an acid or alkali solution to said solution and said concentrate in said converting step to promote the conversion of said solute to the solid phase.

15. The process of claim 1 which includes the step of passing said mixture of solution and solidified solute through a carbon filter.

16. A process for treating an aqueous solution of metal ions which can be concentrate by reverse osmosis and in which the metal ions can be precipitated by increasing the concentration of the metal ions in the solution, said process comprising the steps of providing a source of starting aqueous solution;

precipitating a portion of the metal ions from the solution to form a mixture of solution and precipitate, filtering said mixture to remove the precipitate from the solution, subjecting the remaining solution to reverse osmosis to produce a permeate comprising water essentially free of metal ions and a concentrate comprising a concentrate aqueous solution of metal ions, recycling substantially all of said permeate to the source of the starting aqueous solution, and recycling substantially all of said concentrate to said precipitating step to promote the precipitation of said metal ions.

17. A system for treating a solution of solute which can be concentrated by passing a portion of the solution through an semi-impermeable membrane and in which the solute can be converted to a solidified form by increasing the concentration of the solute in the solution, said system comprising a container housing the solution, a phase conversion device for receiving said solution and converting a portion of the solute to the solid phase to produce a mixture of the solution and the solidified solute;

a physical separation device for removing the solidified solute from said mixture;

a concentration device for subjecting the remaining solution to semi-impermeable membrane to produce a first liquid stream comprising solvent essentially free of solute and a second liquid stream comprising a concentrated solution of solute;

a recycle line for recycling substantially all of said first liquid stream to the container having the starting solution of solute; and a recycle line for recycling substantially all of said second liquid stream to said phase conversion device to increase the concentration of the solution therein.

18. The system of claim 17 which includes means for controlling the pH of the aqueous solution from which said solute is converted to the solid phase.

19. The system of claim 17 wherein said concentration device is a reverse osmosis, electrodialysis, or ultrafiltration device.

20. The system of claim 17 wherein said phase conversion device is a precipitation, crystallization or coagulation tank.

21. The system of claim 17 which includes means for supplying an agent for oxidizing, fermenting, reducing, neutralizing or substituting ions in said solution to a form which promotes precipitation in said phase conversion device.

22. The system of claim 17 wherein said physical separation device includes a carbon filter.

23. A system for treating a substantially continuous stream of aqueous solution of metal ions which can be concentrated by reverse osmosis and in which the metal ions can be precipitated by increasing the concentration of the metal ions in the solution, said process comprising a container having the solution, a precipitation tank for receiving said aqueous solution and precipitating a portion of the metal ions from the solution to form a mixture of solution and precipitate, a filter for receiving said mixture and removing the precipitate from the solution, a reverse osmosis unit for receiving the filtered aqueous solution and producing a permeate comprising water essentially free of metal ions and a concentrate comprising a concentrated aqueous solution of metal ions, a recycle line for recycling substantially all of said permeate to the container having the starting aqueous solution, and a recycle line for recycling substantially all of said concentrate to said precipitation tank to promote the precipitation of said metal ions.

24. A process for treating a substantially continuous stream of water from a rinse tank in an electroplating facility in which the rinse tank water is an aqueous solution of metal ions, said process comprising the steps of delivering the rinse tank water to a precipitation tank and allowing a portion of the metal ions to precipitate from the solution as metal oxides and metal hydroxides, removing a portion of the aqueous solution and precipitate from the precipitation tank, and separating the precipitate from the aqueous solution by filtering, delivering the filtrate to a reverse osmosis unit to product a concentrate and a permeate, the permeate being essentially free of metal ions and the concentrate containing an increased concentration of metal ions, returning substantially all of the permeate to the rinse tank, and returning substantially all of the concentrate to the precipitation tank.

* * * * *